US007472340B2

(12) United States Patent
Burago et al.

(10) Patent No.: US 7,472,340 B2
(45) Date of Patent: Dec. 30, 2008

(54) METHOD AND COMPUTER-READABLE MEDIUM FOR GENERATING A MULTIPLE COLUMN LAYOUT

(75) Inventors: Andrei Burago, Kirkland, WA (US); Sergey Genkin, Kirkland, WA (US); Eliyezer Kohen, Mercer Island, WA (US); Victor Kozyrev, Issaquah, WA (US); Anton A. Sukhanov, Bellevue, WA (US); Igor Zverev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 11/018,717

(22) Filed: Dec. 20, 2004

(65) Prior Publication Data

US 2006/0136811 A1     Jun. 22, 2006

(51) Int. Cl.
*G06F 17/21*     (2006.01)
(52) U.S. Cl. .................. 715/227; 715/246; 715/247; 715/255
(58) Field of Classification Search ............ 715/509, 715/517, 520, 521, 510, 530, 531, 518, 519, 715/212, 227, 228, 243, 246, 247, 255
See application file for complete search history.

(56) References Cited

U.S. PATENT DOCUMENTS 4,608,664 A  *  8/1986  Bartlett et al. ............ 358/1.2
4,891,771 A  *  1/1990  Edel et al. ................. 715/521
5,633,996 A  *  5/1997  Hayashi et al. ............ 715/246
5,953,733 A  *  9/1999  Langford-Wilson ........ 715/210
6,374,273 B1 *  4/2002  Webster ...................... 715/513
6,377,704 B1 *  4/2002  Cooperman ................. 382/176
6,639,611 B1 * 10/2003  Leduc ........................ 715/764
6,966,026 B1 * 11/2005  Sommerer .................. 715/235
7,051,276 B1 *  5/2006  Mogilevsky et al. ....... 715/517
2002/0111969 A1 * 8/2002  Halstead, Jr. .............. 707/517
2004/0194028 A1 * 9/2004  O'Brien ..................... 715/517
2006/0031754 A1 * 2/2006  Lehenbauer et al. ....... 715/510
2006/0198555 A1 * 9/2006  Hosotsubo ................. 382/162
2007/0079236 A1 * 4/2007  Schrier et al. .............. 715/517

OTHER PUBLICATIONS

"CSS3 Module: Multi-Column Layout, W3C Working Draft, Jan. 18, 2001," Version: http://www.w3.org/TR/2001/WD-css3-multicol-20010118, Editor: Håkon Wium Lie, Opera Software, howcome@opera.com. (Nov. 22, 2004), pp. 1-11.

* cited by examiner

*Primary Examiner*—Adam L Basehoar
(74) *Attorney, Agent, or Firm*—Merchant & Gould

(57) ABSTRACT

A computer-implemented method and computer-readable medium are provided for generating a multiple column layout. According to the method, a layout is defined that includes two or more columns and one or more spans that extend across two or more of the columns. Each span is defined as being either content defined or height defined. Content is laid out from a document in each span that is height defined until a defined height is reached. Content is laid out from the document in each span that is content defined until a specified point in the content is reached. When all content or height defined spans have been laid out, the remaining portion of the content is laid out across all of the columns.

14 Claims, 6 Drawing Sheets

METHOD AND COMPUTER-READABLE MEDIUM FOR GENERATING A MULTIPLE COLUMN LAYOUT

TECHNICAL FIELD

The embodiments of the invention relate generally to the field of document processing and, more specifically, to the field of multi-column layouts of document content.

BACKGROUND OF THE INVENTION

Current desktop publishing and word processing application programs allow a user to create complex document layouts. For instance, documents can be created that include text, graphics, tables, footnotes, endnotes, embedded objects, and a virtually endless array of other types of objects. Document content can also be arranged in a manner to create visually appealing documents. For instance, text can be wrapped around the various types of objects in a document to create an attractive layout. Additionally, text can be formatted in multiple columns by laying out text and other document objects across multiple vertical columns. Multi-column document layouts are easy to read and are commonly utilized in newspapers and magazines.

Although previous desktop and word processing application programs are capable of creating documents with a multi-column layout, these previous applications are severely limited in their capabilities. In particular, previous applications have allowed users to specify only the number of columns that should be utilized within the layout and the width of each of the columns. The application program then renders the document content into the specified number of columns.

More complex multi-column layouts have long been utilized within the newspaper and magazine industries. For instance, a multi-column layout has been utilized wherein a heading, sub-heading, or lead-in spans multiple columns. However, complex multi-column layouts such as these have been typically typeset by hand, which is a tedious and time consuming process. For complex multi-column layouts such as these, current word processing and desktop publishing application programs require a user to manually define the page layout. These programs may then format the content into the manually defined layout. However, these programs cannot take the properties and constraints of the structural elements of a document and calculate the actual distribution of the content between pages and layout the content on each page automatically.

It is with respect to these considerations and others that the various embodiments of the present invention have been made.

BRIEF SUMMARY OF THE INVENTION

In accordance with the present invention, the above and other problems are solved by a computer-implemented method and computer-readable medium for generating a multi-column layout. Through the embodiments of the invention, complex multi-column layouts may be created, such as layouts that allow document content to span multiple columns.

According to one aspect of the invention, a computer-implemented method is provided for generating a multi-column layout. According to the method, a layout is defined for a portion of a document that defines the number of columns that should be utilized to layout the document content. The layout also identifies one or more spans that should extend across two or more of the columns. For instance, a layout may be defined that includes four columns. A span may be defined for a headline that extends across all four of the columns, a span may be defined for a sub-heading that extends across three of the columns, and another span may be defined for a text lead-in that extends across only two of the columns.

According to the embodiments of the invention, each span area may be defined as being either a content defined span area or a height defined span area. A content defined span area allows content to be laid out within the span until a defined point within the content is reached. In this manner, a particular span can be filled with content until the defined point is encountered. This is useful, for instance, for a headline or sub-heading. A height defined span area allows content to be laid out within the span until the content reaches a specified height. In this manner, the height for a span may be defined and content may be laid out in the span until the height is reached. This is useful, for instance, for a text lead-in.

According to other aspects of the invention, content for each span area that is content defined is laid out until the specified point in the content is reached. Content is laid out for each span area that is height defined until the specified height for the span is reached. When all of the content and height defined spans have been laid out, any remaining content is laid out across all of the columns. In particular, the remaining content may be column balanced across all of the columns.

According to other embodiments of the invention, a layout manager is provided that is operative to provide content layout facilities for a client application, such as a word processing application or desktop publishing application. The layout manager is operative to receive from the client application the definition of a multi-column layout for content within a document. The definition identifies the number of columns that should be utilized within the multi-column layout. The definition also defines one or more spans that extend across two or more of the columns. Each span is also defined as being content defined or height defined.

The layout manager is further operative to receive from the client application the content to be laid out in each of the spans. The layout manager lays out the content for each content defined span until the specified point in the content is reached. The layout manager lays out the content for each height defined span until the specified height for the span is reached. When all of the height and content defined spans have been laid out by the layout manager, any remaining content is laid out across all of the columns. The remaining content may be column balanced by the layout manager. When the layout manager has completed laying out the content in the defined multi-column layout, the layout results are returned to the client application for display.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent

DETAILED DESCRIPTION OF THE INVENTION

Figure 1:
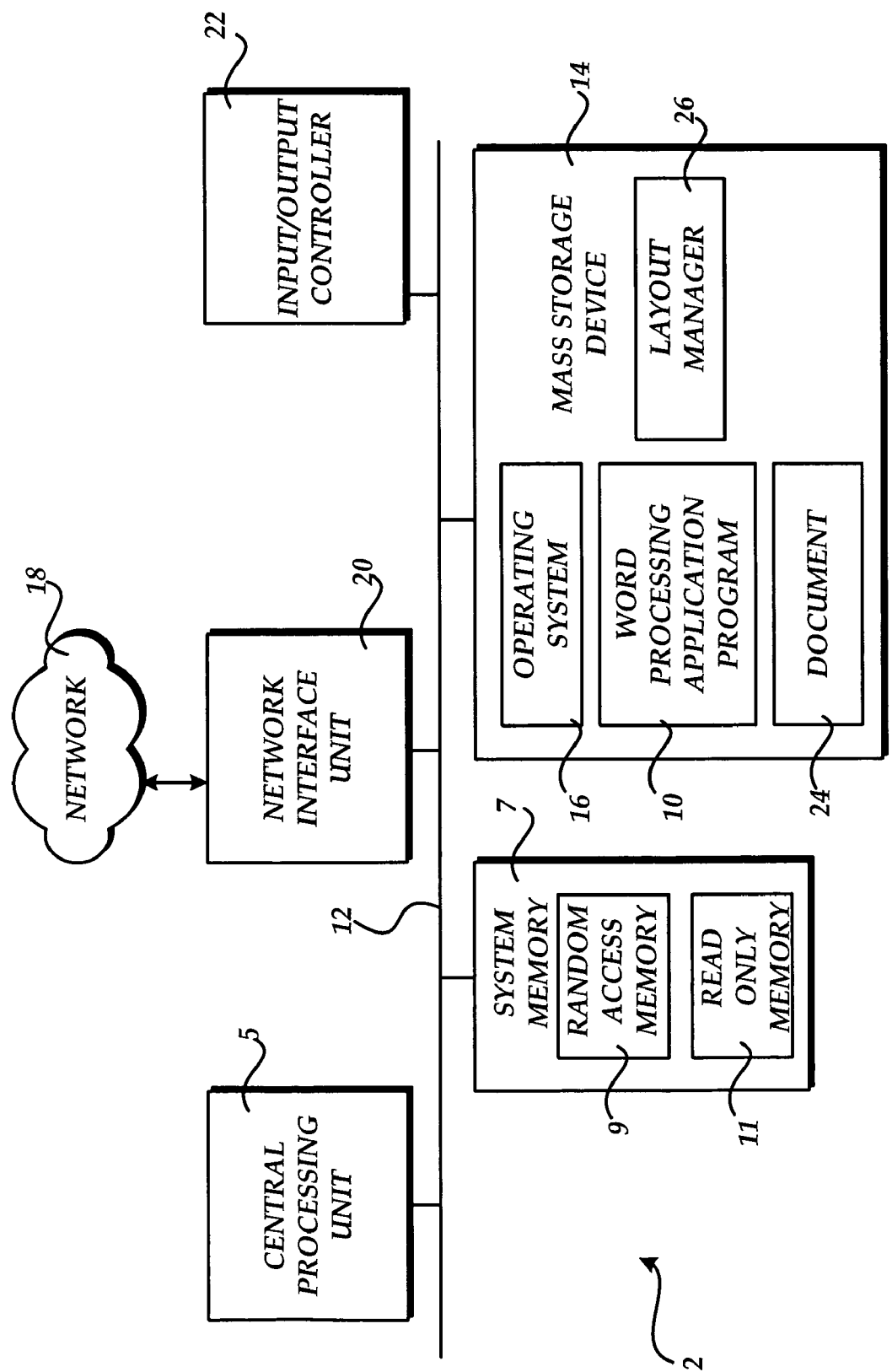
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the document 24. According to one embodiment of the invention, the word processing application program 10 comprises the MICROSOFT WORD word processing application program from MICROSOFT CORPORATION. It should be appreciated, however, that other word processing application programs from other manufacturers may be utilized to embody the various aspects of the present invention. It should also be appreciated that other types of application programs that perform document layout functions may be utilized with the aspects of the present invention. For instance, the embodiments of the present invention may be utilized with desktop publishing programs, presentation programs, web browsers, and any other type of program that lays content out on a document page.

In conjunction with the editing of a word processing document, the word processing application program 10 provides functionality for allowing a user to create a multiple column layout. In particular, a user may define a section of the document 24 or an appropriate sub-part of the document 24, such as a table, text box, footnote area, or other portion, as being formatted into multiple columns. The word processing application program 10 is then operative to format the portion of the document into the multi-column format as requested. The word processing application program 10 may communicate with a layout manager 26 to assist in the formatting of the document 24. As will be described in greater detail below, the layout manager 26 provides layout services to the word processing application program 10, and to any other program executing on the computer 2. In particular, the layout manager 26 receives from a client application, such as the word processing application program 10, a description of the multi-column layout and the content that should be laid out. In response, the layout manager 26 generates the appropriate layout and returns the layout to the client application for display. Additional details regarding the operation of the layout manager 26 will be provided below with respect to FIGS. 2-6.

Figure 2:
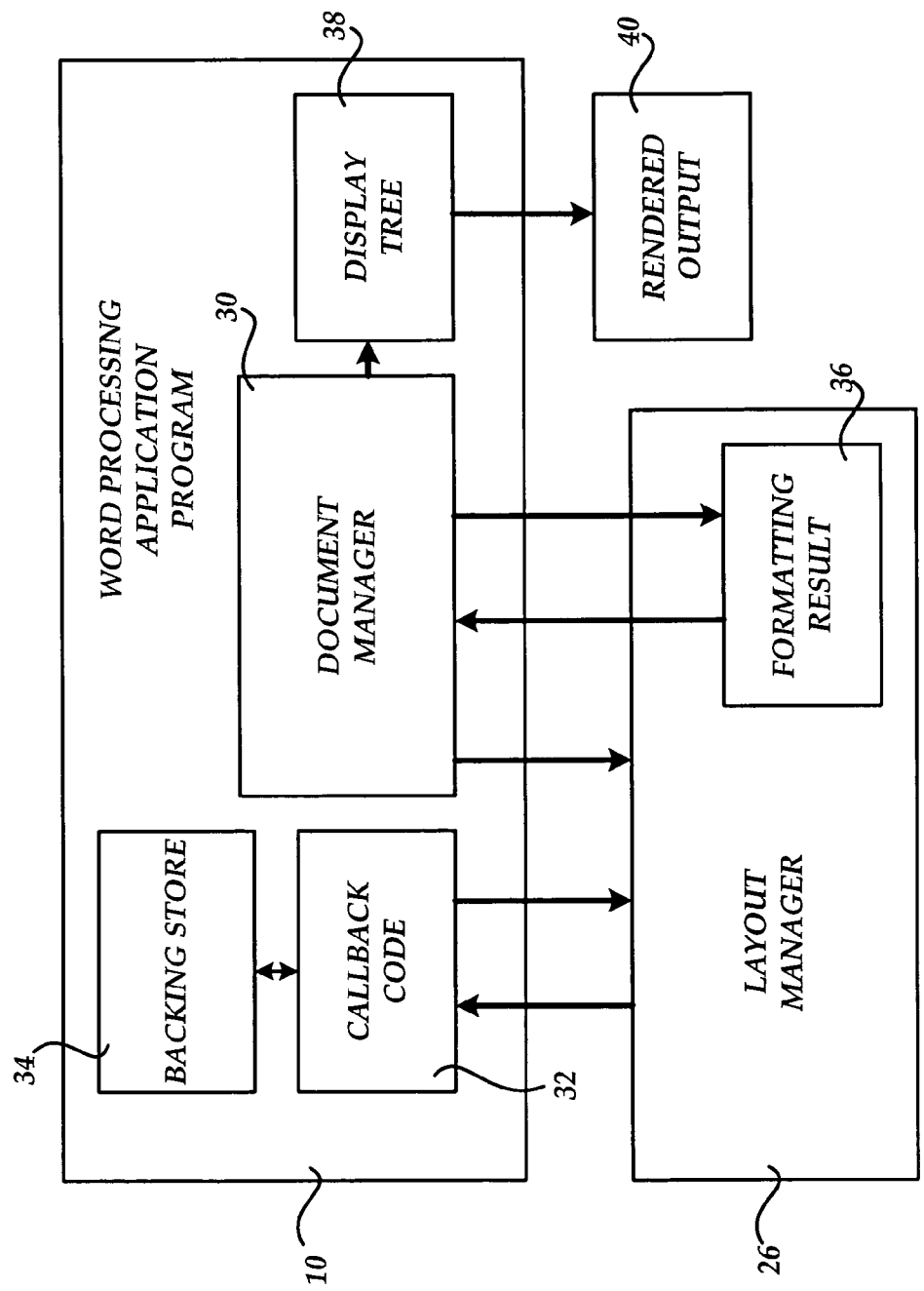
FIG. 2 is a software architecture diagram that illustrates aspects of several software components utilized in the embodiments of the invention.

Turning now to FIG. 2, additional details will be provided regarding the interaction between a client application, such as the word processing application program 10, and the layout manager 26. As described briefly above, the layout manager 26 provides document layout services to the application 10. In particular, the application 10 may communicate with the layout manager 26 to request the layout of portions of a document 24 stored in a backing store 34. In order to facilitate communication with the layout manager 26, the application 10 may implement one or more callback routines, illustrated in FIG. 2 as callback code 32. Through the use of the callback code 32, the layout manager 26 may query the application program 10 for additional information necessary to layout various portions of the document.

As will be described in greater detail below, the layout manager 26 provides facilities for laying out content in several complex multi-column formats. The layout manager 26 provides these facilities in response to a request from the application program 10 to layout the content in a multi-column format. The document manager 30 of the application program 10 may communicate with the layout manager 26 to request that content be laid out in a multi-column format. The document manager 30 may provide a definition of the format to the layout manager 10 that describes the number of columns to be utilized in the multi-column format. The document manager 30 may also identify to the layout manager 26 one or more spans to be included in the format. Each span may extend across one or more of the columns.

The document manager 30 may also define each span as being height defined or content defined. A content defined span area allows content to be laid out within the span until a defined point within the content is reached. A height defined span area allows content to be laid out within the span until the content reaches a specified height. Additional details regarding height and content defined spans will be provided below with respect to FIGS. 3 and 4.

The document manager 30 may also provide to the layout manager 26 the text and other content from the document that should be laid out into the multi-column format. The document manager 30 may initially provide some of the content to the layout manager 26. The layout manager 26 may then request additional content from the callback code 32 as needed to layout the multi-column format. The document manager 30 may also indicate to the layout manager 26 the style of the text to be laid out. For instance, the document manager 30 may indicate the typestyle, size, and other information necessary to lay out the text to the layout manager 26.

Once the layout manager 26 has laid out the content in the multi-column format in the manner described herein, the formatting result 36 is passed back to the document manager 30. In response to receiving the formatting result 36, the document manager 30 is operative to update the display tree 38 maintained by the application program 10. Based on the changes to the display tree 38, the application program 10 may update its rendered output 40 to display the formatting result to a user. It should be appreciated that the use of the display tree 38 is merely illustrative and that other methodologies may be utilized for updating the display of the formatting result. Additional details regarding the operation of the application 10 and the layout manager 26 are provided below with respect to FIGS. 3-6.

Figure 3:
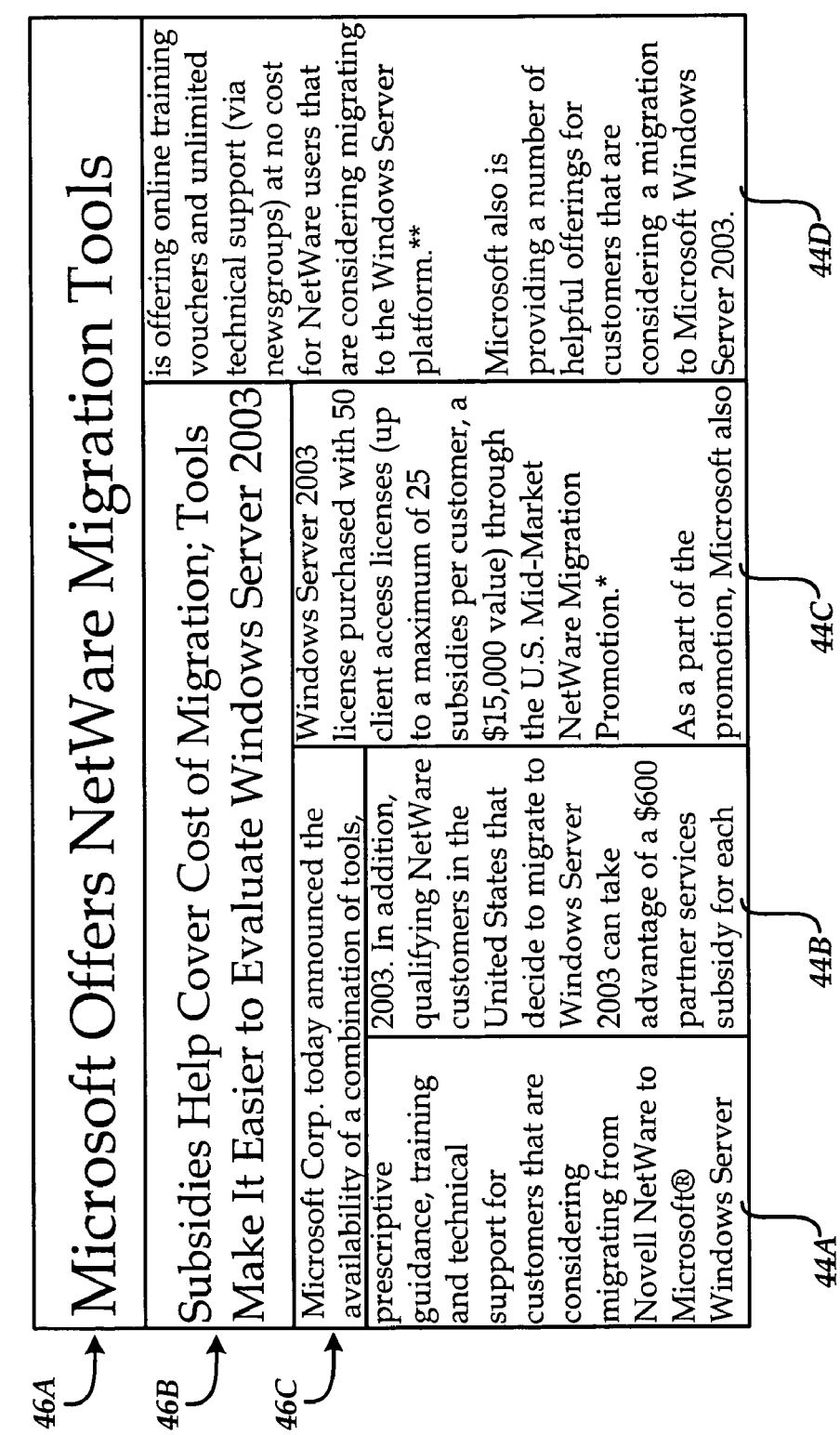
FIGS. 3 and 4 are screen diagrams illustrating several multi-column layouts provided by the embodiments of the invention.

Referring now to FIG. 3, a screen diagram illustrating one multi-column layout provided by the embodiments of the invention will be described. As shown in FIG. 3, an exemplary multi-column layout 42A is provided that spans multiple columns. In particular, the exemplary multi-column layout 42 spans the four columns 44A-44D. The multi-column layout 42A shown in FIG. 3 also includes several spans 46A-46C. Each of the spans 46A-46C may be height or content defined. For instance, the span 46A is content defined, thereby allowing a headline to be positioned at the top of all four columns 44A-44D. The span 46B is also content defined, thereby allowing a sub-heading to be shown that spans three columns 44A-44C. The span 46C is height defined, thereby providing text that leads into the remainder of the content that is laid out into the columns 44A-44D. As shown in FIG. 3, the remaining content may be laid out into the columns 44A-44D. This remaining content may also be column balanced thereby allowing the columns to end in approximately the same position even though they may be different heights.

Figure 4:
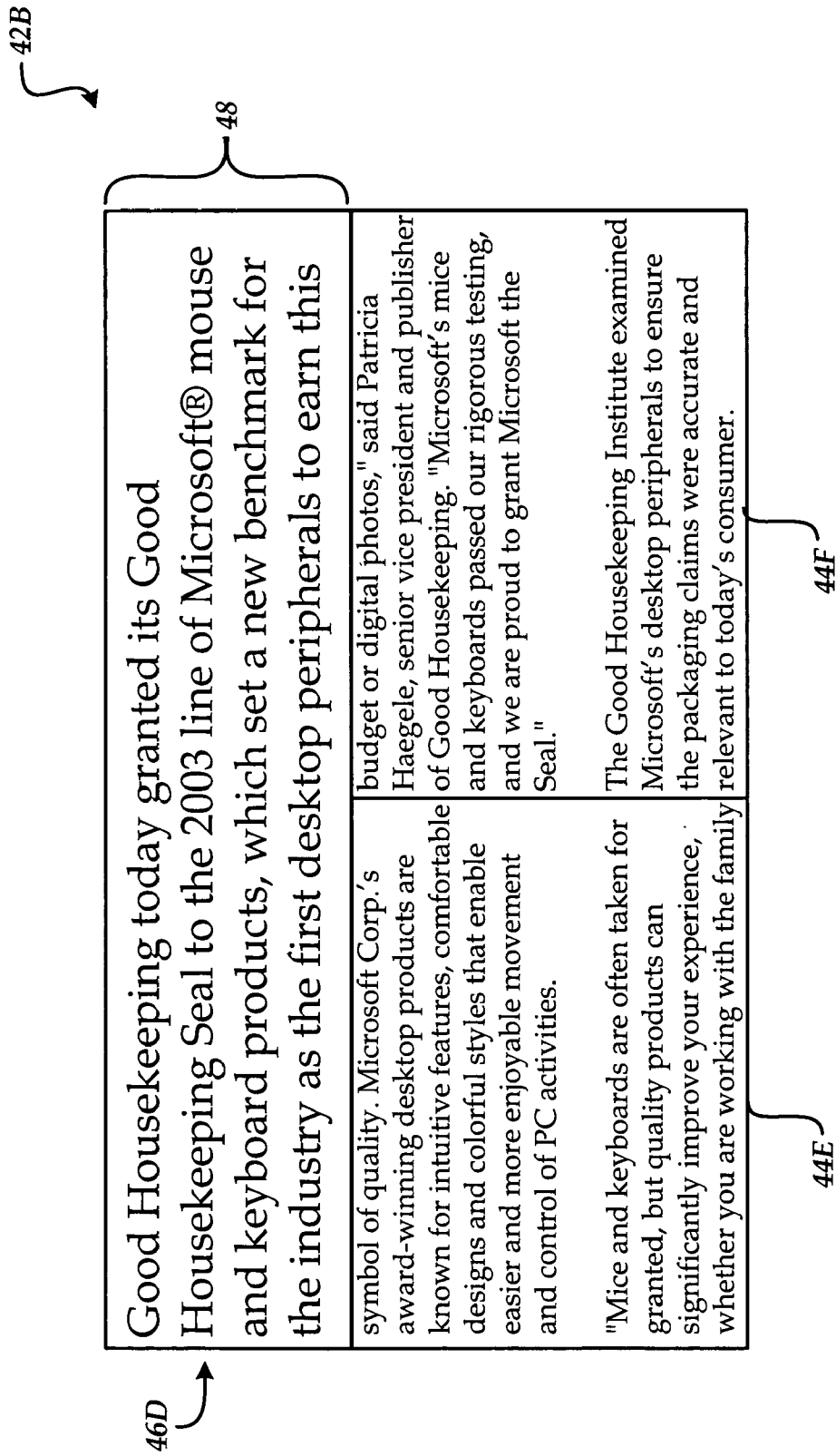

Turning now to FIG. 4, a screen diagram illustrating another multi-column layout provided by the embodiments of the invention will be described. As shown in FIG. 4, an exemplary multi-column layout 42B is provided that spans two columns 44E and 44F. In this example, only one span 46D has been defined that spans both of the columns 44E and 44F. The span 46D has been defined as a height defined span. In particular, a height 48 has been specified by the client application for the span 46D. As will be described in detail below, the layout manager 26 will lay out content into the span 46D until the content reaches the specified height 48. The layout manager 26 will then switch to rendering content into the columns 44E and 44F. As with the example described above with respect to FIG. 3, the layout manager 26 may column balance the remaining content to ensure that the columns 44E and 44F end at approximately the same location. It should be appreciated that the font changes at the position where the layout switches from one column into multiple columns.

It should be appreciated that the multi-column layouts shown in FIGS. 3 and 4 are merely illustrative and that other combinations are possible utilizing the various embodiments of the present invention. For instance, any number of columns may be utilized, unequal column widths may be specified, and other modifications may be made to the layouts known to those skilled in the art.

Figure 5:
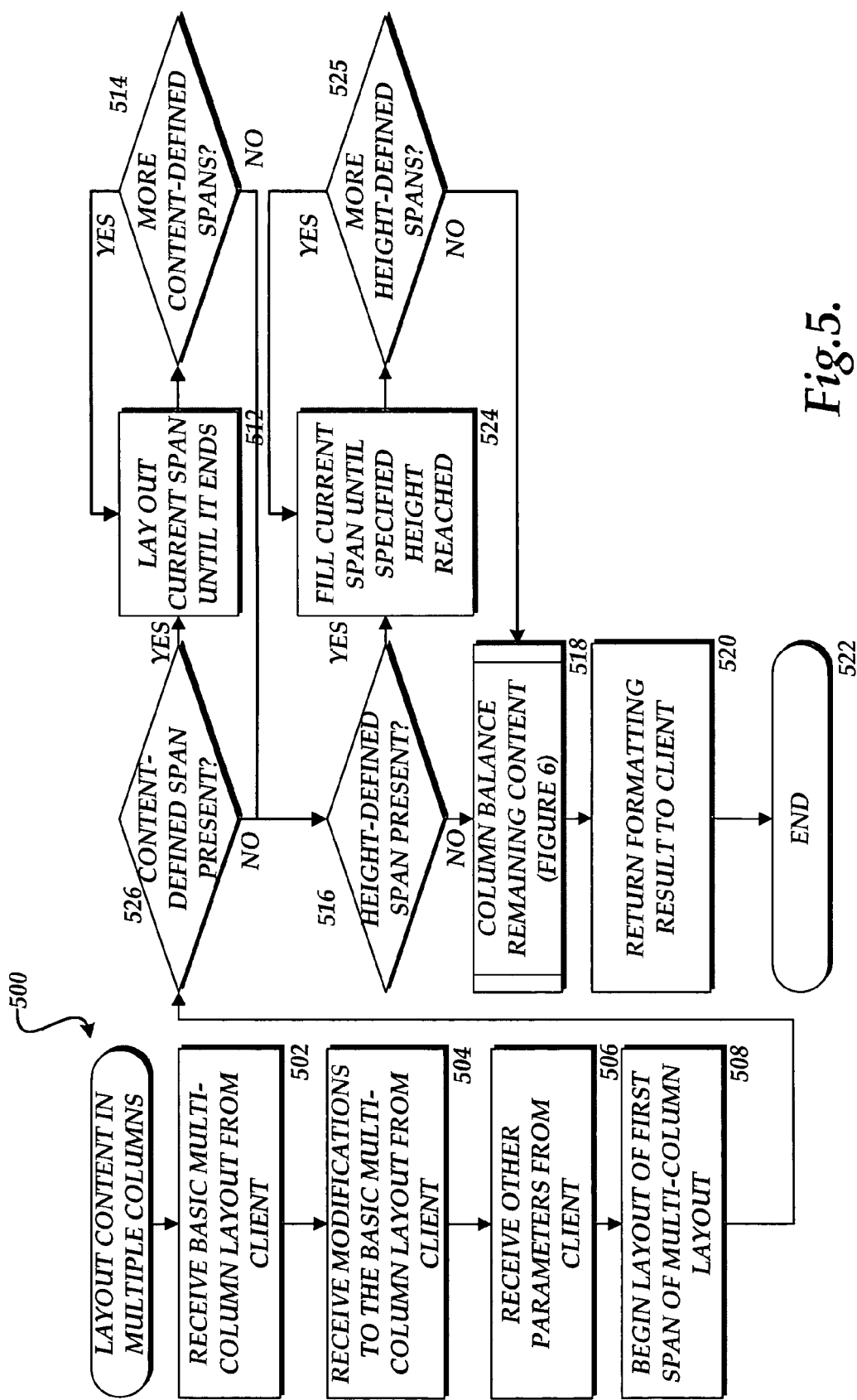
FIGS. 5-6 are flow diagrams that illustrate an exemplary process for generating a multi-column layout according to the various embodiments of the invention.

Referring now to FIG. 5, an illustrative routine 500 will be described illustrating a process for generating a multi-column layout. It should be appreciated that although the embodiments of the invention described herein are described as being performed by the layout manager 26, the various aspects of the invention may be utilized directly in application programs that perform page layout functions. For instance, the embodiments of the invention described herein may be performed directly by the word processing application program 10.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 5-6, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 500 begins at operation 502 where the layout manager 26 receives from the client application a description of the basic properties of the multi-column layout. The routine 500 then continues to operation 504, where the client application describes modifications to the basic number of columns. In particular, the client application describes the spans that should be used in the multi-column layout. For each span, the client application also indicates whether the span should be content or height defined. If a span is content defined, the client application indicates the specific point in the content where rendering into the span should stop. If a span is height defined, the client application indicates the specific height of the span. The routine 500 then continues from operation 504 to operation 506.

At operation 506, the client application indicates to the layout manager 26 any other parameters necessary to lay out the content. For instance, a style for the content including the typeface and font size may be specified by the client application. The routine 500 then continues to operation 508 where the layout manager 26 begins laying out the content in the multi-column format beginning with the first span. In particular, at operation 526, the layout manager 26 determines whether the current span is a content defined span. If the current span is a content defined span, the routine 500 branches to operation 512 where the layout manager 26 lays out content in the current span until the span ends. Once the span ends, the routine 500 continues to operation 514, where a determination is made as to whether any additional content defined spans exist. If more content defined spans exist, the routine 500 branches back to operation 512, where the next content defined span is laid out. If no additional content defined spans exist, the routine 500 continues to operation 516, described below.

If, at operation 526, the layout manager 26 determines that the current span is not a content defined span, the routine 500 continues from operation 526 to operation 516. At operation 516, the layout manager 26 determines if any height defined spans exist. If one or more height defined spans exist, the routine 500 branches to operation 524. At operation 524, the layout manager 26 fills the current span with content until the desired height is reached. Once the desired height is reached, the routine 500 continues to operation 525, where a determination is made as to whether any additional height defined spans exist. If more height defined spans exist, the routine 500 branches back to operation 524, where the next height defined span is laid out. If no additional content defined spans exist, the routine 500 continues to operation 518, described below.

If, at operation 516, the layout manager 26 determines that no height defined spans exist, the routine 500 continues to operation 518 where the layout manager 26 lays out the remaining content into the columns. In one embodiment, the layout manager 26 column balances the remaining content. An illustrative routine 600 for column balancing the remaining content is described below with respect to FIG. 6. From operation 518, the routine 500 continues to operation 520, where the formatting result is returned from the layout manager 26 to the client application for display. The routine 500 then continues to operation 522, where it ends.

At operation 524, a determination is made as to whether more spans remain to be laid out. If additional spans remain to be laid out, the routine 500 branches to operation 510, where the next span is processed. In particular, the next span is processed at operations 526, 512, 514, 516, 518, 520, and 524 in the manner described above. This process continues until no additional spans remain to be processed.

It should be appreciated that the algorithm illustrated in FIG. 5 lays out content defined spans prior to laying out height defined spans. This is a design choice based on the fact that many magazines and newspapers lay out text in this manner. However, according to embodiments of the invention, height defined spans may be laid out prior to content defined spans and the several types of spans may be intermingled.

Figure 6:
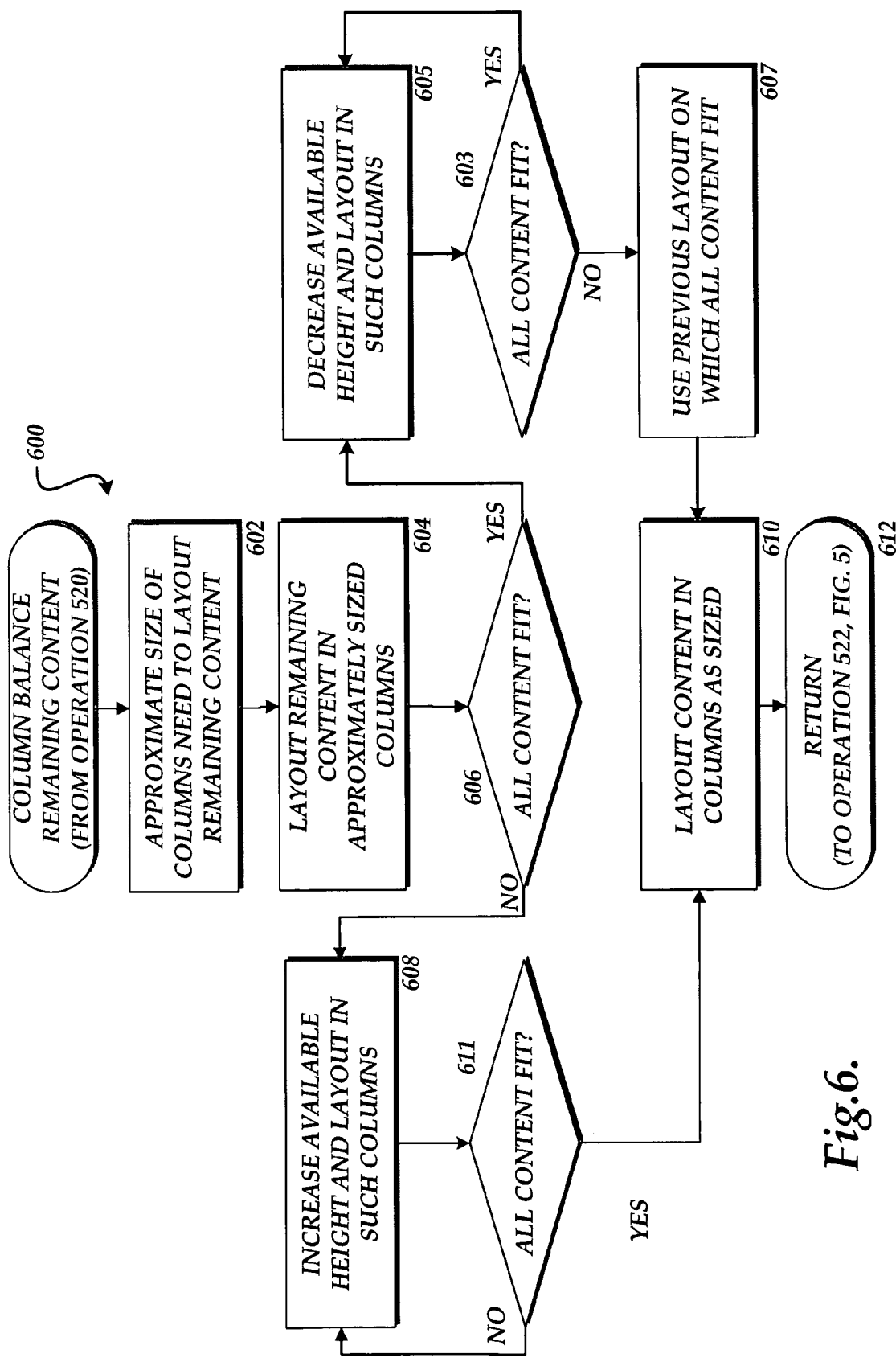

Referring now to FIG. 6, an illustrative routine 600 will be described for column balancing the content in the specified columns. The routine 600 begins at operation 602 where the layout manager 26 approximates the vertical size of the columns necessary to lay out the remaining content. In particular, the layout manager 26 approximates the vertical size of the columns necessary to lay out the remaining content in a manner that will allow the content in each column to end at approximately the same point.

Once the layout manager 26 has approximated the size of the columns, the routine 600 continues to operation 604, where the layout manager 26 lays out the remaining content into the approximately sized columns. The routine 600 then continues to operation 606 where a determination is made as to whether the remaining content fit within the approximately sized columns. If the remaining content did not fit, the routine 600 branches to operation 608 where the approximated size of the columns is increased slightly. The routine 600 then continues to operation 611, where another determination is made as to whether the content fit. If the content does not fit, the routine 600 branches back to operation 608, where the height of the columns is again increased. If the content fits, the routine 600 continues to operation 610, discussed below.

If, at operation 606, the layout manager 26 determines that the remaining content fit within the approximately sized columns, the routine 600 continues to operation 605, where the height of the shortest line is decreased. The routine 600 then continues to operation 603, where a determination is made as to whether all of the content fits on the page. If the content fits, the routine 600 then returns to operation 605, where the height of the shortest line is again decreased. If the content does not fit, the routine 600 continues to operation 607, where the previous layout on which all of the content fit is utilized as the final layout. From operation 607, the routine 600 continues to operation 610, where the content is laid out into the approximately sized columns by the layout manager 26. The routine 600 then continues to operation 612, where it returns to operation 522, described above with respect to FIG. 5.

Based on the foregoing, it should be appreciated that the various embodiments of the invention include a method, system, apparatus, and computer-readable medium for generating a multi-column layout. It should be also appreciated that the embodiments of the invention described herein may also be utilized to provide a multi-column layout within other types of elements other than a page. For instance, a multi-column layout may be generated within a section, text box, table cell, and footnotes.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for generating a multiple column layout, the method comprising:
   defining a layout for a portion of a document, the layout comprising at least two columns and at least two spans that extend across the at least two columns, wherein each span is defined as one of the following: content defined and height defined;
   laying out a first portion of content from the document in each span that is defined as height defined until a specified height for the span is reached;
   laying out a second portion of the content from the document in each span that is defined as content defined until a specified point in the content is reached wherein the second portion of the content precedes in the document the first portion of the content;
   determining whether any of the content has been laid out in all of the spans that are defined as one of the following: content defined and height defined; and
   in response to determining that any of the content has been laid out in all of the spans that are defined as one of the following: content defined and height defined, laying out a remaining portion of the content across all of the columns, wherein laying out the remaining portion of the content across all of the columns comprises approximating a vertical size for the columns necessary to lay out the remaining content such that the remaining content in each column is apportioned among the columns according to the amount of each column not occupied by either the first portion of the content from the document that is defined as height defined and the second portion of the content from the document that is defined as content defined and such that the remaining content in each column ends at the same point, wherein the at least two spans extended across the at least two columns are different widths with respect to each other, the vertical size of each of the at least two columns are different with respect to each other and the width of the at least two columns are different with respect to each other, wherein the content in each span is formatted different than the content in the remaining portion of the content across all of the columns, wherein approximating the vertical size for the columns comprises:
     determining if the remaining content will fit within the approximated vertical size for the columns,
     in response to determining that the remaining content does not fit within the approximated vertical size for the columns, increasing the approximated vertical size for the columns and repeating the determining if the remaining content will fit until the remaining content will fit within the approximated vertical size for the columns, and
     in response to determining that the remaining content does fit within the approximated vertical size for the columns, decreasing the approximated vertical size for the columns, repeating the determining if the remaining content does fit until the remaining content does not fit within the approximated vertical size for the columns, and returning to a previous layout on which all of the content fit.

2. The method of claim 1, wherein a client application defines the layout and the spans and wherein a layout manager lays out the content and returns a layout result to the client application.

3. The computer-implemented method of claim 1, wherein defining the layout comprises defining the layout wherein the at least two spans are adjacent to one another.

4. The computer-implemented method of claim 1, wherein defining the layout comprises defining the layout wherein each span that is defined as content defined is placed above each span that is defined as height defined.

5. The computer-implemented method of claim 1, wherein defining the layout comprises defining the layout wherein the at least two columns are adjacent to one another.

6. The computer-implemented method of claim 1, wherein defining the layout comprises defining the layout wherein the at least two spans are above the at least two columns.

7. A computer-readable storage medium having computer-executable instructions stored thereon which, when executed by a computer, will cause the computer to:
   define a layout for a portion of a document, the layout comprising at least two columns and at least two spans of content that extend across the at least two columns, wherein each span is defined as one of the following: content defined and height defined;
   lay out a first portion of content from the document in each span that is defined as height defined until a specified height for the span is reached;
   lay out a second portion of the content from the document in each span that is defined as content defined until a specified point in the content is reached wherein the second portion of the content precedes in the document the first portion of the content;
   determine whether any of the content has been laid out in all of the spans that are defined as one of the following: content defined and height defined; and
   in response to determining that any of the content has been laid out in all of the spans that are defined as one of the following: content defined and height defined, to lay out a remaining portion of the content across all of the columns, wherein laying out the remaining portion of the content across all of the columns comprises approximating a vertical size for the columns necessary to lay out the remaining content such that the remaining content in each column is apportioned is apportioned among the columns according to the amount of each column not occupied by either the first portion of the content from the document that is defined as height defined and the second portion of the content from the document that is defined as content defined and such that the remaining content in each column ends at the same point, wherein the at least two spans extended across the at least two columns are different widths with respect to each other, the vertical size of each of the at least two columns are different with respect to each other and the width of the at least two columns are different with respect to each other, wherein the content in each span is formatted different than the content in the remaining portion of the content across all of the columns, wherein approximating the vertical size for the columns comprises:
     determine if the remaining content will fit within the approximated vertical size for the columns,
     in response to determining that the remaining content does not fit within the approximated vertical size for the columns, increase the approximated vertical size for the columns and repeat the determining if the remaining content will fit until the remaining content will fit within the approximated vertical size for the columns, and
     in response to determining that the remaining content does fit within the approximated vertical size for the columns, decrease the approximated vertical size for the columns, repeat the determining if the remaining content does fit until the remaining content does not fit within the approximated vertical size for the columns, and return to a previous layout on which all of the content fit.

8. The computer-readable storage medium of claim 7, wherein a client application defines the layout and the spans and wherein a layout manager lays out the content and returns a layout result to the client application.

9. The computer-readable storage medium of claim 7, wherein causing the computer to define the layout comprises causing the computer to define the layout wherein the at least two spans are adjacent to one another.

10. The computer-readable storage medium of claim 7, wherein causing the computer to define the layout comprises causing the computer to define the layout wherein each span that is defined as content defined is placed above each span that is defined as height defined.

11. The computer-readable storage medium of claim 7, wherein causing the computer to define the layout comprises causing the computer to define the layout wherein the at least two columns are adjacent to one another.

12. The computer-readable storage medium of claim 7, wherein causing the computer to define the layout comprises causing the computer to define the layout wherein the at least two spans are above the at least two columns.

13. A computer-implemented method for generating a multiple column layout, the method comprising:

providing a layout manager operative to receive from a client application the definition of a layout for content within a document, the layout comprising at least two columns and at least two spans that extend across the at least two columns, and wherein each span is defined by the client application as being one of the following: content defined and height defined, and to receive a request from the client application program to layout content from the document according to the definition; and wherein the layout manager is further operative to:
 lay out a first portion of the content from the document in each span that is defined as height defined until a specified height for the span is reached, to lay out a second portion of the content from the document in each span that is defined as content defined until a specified point in the content is reached, and to return the layout to the client application program wherein the second portion of the content precedes in the document the first portion of the content;
 determine whether the any of the content has been laid out in all of the spans that have been defined by the client application program as being one of the following: content defined and height defined; and in response to determining that any of the content has been laid out in all of the spans that are defined as one of the following: content defined and height defined, to lay out a remaining portion of the content across all of the columns, wherein laying out the remaining portion of the content across all of the columns comprises approximating a vertical size for the columns necessary to lay out the remaining content such that the remaining content in each column is apportioned is apportioned among the columns according to the amount of each column not occupied by either the first portion of the content from the document that is defined as height defined and the second portion of the content from the document that is defined as content defined and such that the remaining content in each column ends at the same point, wherein the at least two spans extended across the at least two columns are different widths with respect to each other, the vertical size of each of the at least two columns are different with respect to each other and the width of the at least two columns are different with respect to each other, wherein the content in each span is formatted different than the content in the remaining portion of the content across all of the columns, wherein approximating the vertical size for the columns comprises:

determining if the remaining content will fit within the approximated vertical size for the columns, in response to determining that the remaining content does not fit within the approximated vertical size for the columns, increasing the approximated vertical size for the columns and repeating the determining if the remaining content will fit until the remaining content will fit within the approximated vertical size for the columns, and in response to determining that the remaining content does fit within the approximated vertical size for the columns, decreasing the approximated vertical size for the columns, repeating the determining if the remaining content does fit until the remaining content does not fit within the approximated vertical size for the columns, and returning to a previous layout on which all of the content fit.

14. The computer-implemented method of claim 13, wherein providing the layout manager operative to receive from the client application the definition of the layout for content within the document, the layout comprising at least two columns and at least two spans comprises providing the layout manager operative to receive from the client application the definition of the layout for content within the document, the layout comprising at least two columns and at least two spans being adjacent to one another.

* * * * *